US012705776B2

(12) United States Patent
Kido et al.

(10) Patent No.: US 12,705,776 B2
(45) Date of Patent: Aug. 11, 2026

(54) SIGNAL PROCESSING DEVICE

(71) Applicant: Hitachi Astemo, Ltd., Hitachinaka (JP)

(72) Inventors: Hideaki Kido, Tokyo (JP); Tatsuhiko Monji, Hitachinaka (JP); Hirotomo Sai, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 471 days.

(21) Appl. No.: 18/003,575

(22) PCT Filed: Jul. 12, 2021

(86) PCT No.: PCT/JP2021/026140
§ 371 (c)(1),
(2) Date: Dec. 28, 2022

(87) PCT Pub. No.: WO2022/059314
PCT Pub. Date: Mar. 24, 2022

(65) Prior Publication Data

US 2023/0260147 A1 Aug. 17, 2023

(30) Foreign Application Priority Data

Sep. 16, 2020 (JP) ................................ 2020-155075

(51) Int. Cl.
*G06T 7/70* (2017.01)
*G06V 10/74* (2022.01)

(52) U.S. Cl.
CPC .............. *G06T 7/70* (2017.01); *G06V 10/761* (2022.01)

(58) Field of Classification Search
CPC ............. G06T 7/70; G06T 2207/30252; G06T 2207/30261; G06V 20/56; G06V 10/761
See application file for complete search history.

(56) References Cited

U.S. PATENT DOCUMENTS 8,849,494 B1 * 9/2014 Herbach .............. G05D 1/0044 701/24
9,056,395 B1 * 6/2015 Ferguson .............. G01S 17/931
(Continued)

FOREIGN PATENT DOCUMENTS

JP 2006-251894 A 9/2006
JP 2012-103858 A 5/2012
(Continued)

OTHER PUBLICATIONS

International Search Report with English Translation and Written Opinion of International Application No. PCT/JP2021/026140 dated Aug. 10, 2021.

*Primary Examiner* — Shaghayegh Azima
(74) *Attorney, Agent, or Firm* — Foley & Lardner LLP

(57) ABSTRACT

Provided is a signal processing device with which, even when detection objects differ among a plurality of sensors, it is possible to correctly obtain the relationship between a non-shared detection object and a detection object that is shared after fusion.
The present invention: stores a first positional relationship (for example, inside and outside a host vehicle lane) between a first object (for example, a vehicle ahead) recognized on the basis of an image captured by an imaging device 301, and a second object (for example, a white line); obtains the position of the first object on the basis of information about the first object recognized on the basis of information obtained from a sensor differing from the imaging device 301, and of information about the first object recognized on the basis of the image captured by the imaging device 301; obtains a second positional relationship (for example, inside and outside the host vehicle lane) between the obtained first object, and the second object recognized on the basis of the image captured by the imaging device 301; and compares the first positional relationship and the second positional
(Continued)

relationship to determine a final positional relationship of the first object and the second object.

6 Claims, 11 Drawing Sheets

(56) References Cited

U.S. PATENT DOCUMENTS

| | | | | |
|---|---|---|---|---|
| 11,145,101 | B2 * | 10/2021 | Choi | G06T 15/20 |
| 11,501,459 | B2 * | 11/2022 | Ikeda | G06T 7/70 |
| 2019/0244023 | A1 * | 8/2019 | Havnør | G06V 20/58 |
| 2019/0266734 | A1 * | 8/2019 | Yamanaka | G06T 7/50 |
| 2019/0293758 | A1 * | 9/2019 | Masui | G08G 1/16 |
| 2019/0329783 | A1 * | 10/2019 | Shalev-Shwartz | B60W 30/09 |
| 2020/0088539 | A1 * | 3/2020 | Shashua | B60W 60/001 |
| 2020/0089232 | A1 * | 3/2020 | Gdalyahu | B60W 60/001 |
| 2020/0333784 | A1 * | 10/2020 | Shashua | G05D 1/0276 |
| 2021/0316669 | A1 * | 10/2021 | Wang | G01S 13/862 |
| 2022/0244779 | A1 * | 8/2022 | Takamoto | G06T 7/97 |

FOREIGN PATENT DOCUMENTS

| | | | |
|---|---|---|---|
| JP | 5145986 | B2 | 2/2013 |
| JP | 2017-182696 | A | 10/2017 |

* cited by examiner

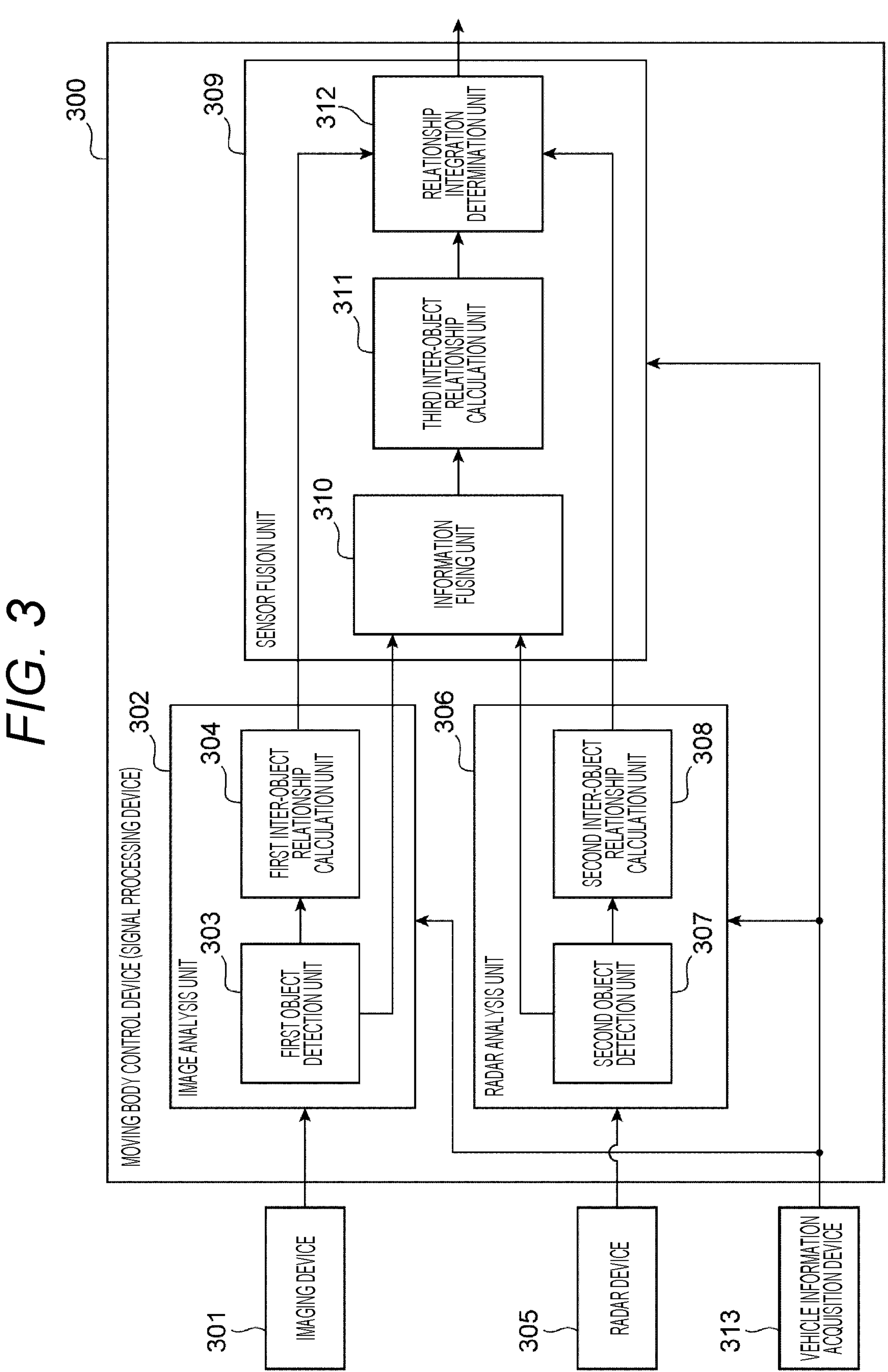
FIG. 3
300
MOVING BODY CONTROL DEVICE (SIGNAL PROCESSING DEVICE)
302
IMAGE ANALYSIS UNIT
303
FIRST OBJECT DETECTION UNIT
304
FIRST INTER-OBJECT RELATIONSHIP CALCULATION UNIT
306
RADAR ANALYSIS UNIT
307
SECOND OBJECT DETECTION UNIT
308
SECOND INTER-OBJECT RELATIONSHIP CALCULATION UNIT
309
SENSOR FUSION UNIT
310
INFORMATION FUSING UNIT
311
THIRD INTER-OBJECT RELATIONSHIP CALCULATION UNIT
312
RELATIONSHIP INTEGRATION DETERMINATION UNIT
301
IMAGING DEVICE
305
RADAR DEVICE
313
VEHICLE INFORMATION ACQUISITION DEVICE

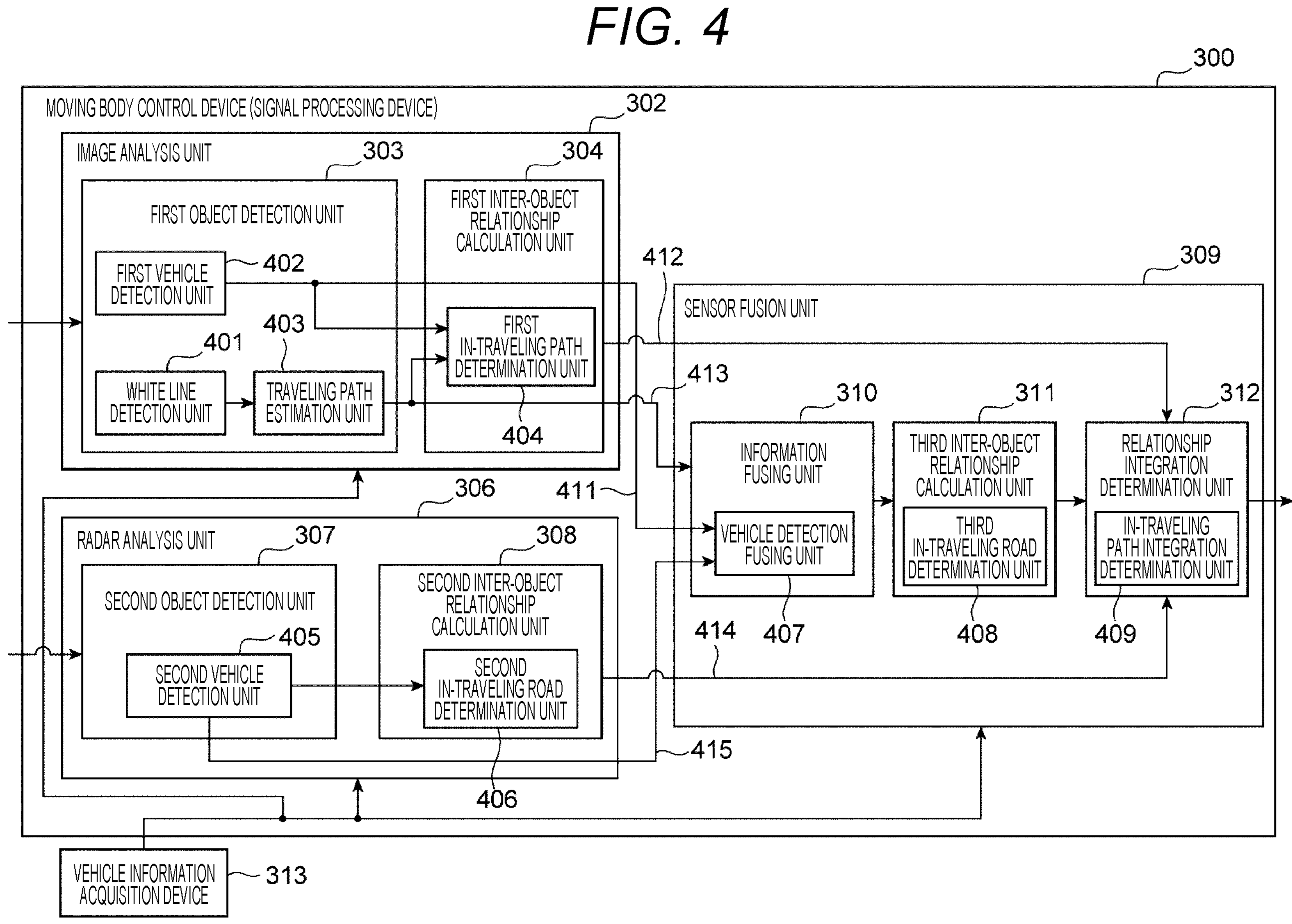
FIG. 4
300
MOVING BODY CONTROL DEVICE (SIGNAL PROCESSING DEVICE)
302
IMAGE ANALYSIS UNIT
303
FIRST OBJECT DETECTION UNIT
304
FIRST INTER-OBJECT RELATIONSHIP CALCULATION UNIT
FIRST VEHICLE DETECTION UNIT
402
401
403
WHITE LINE DETECTION UNIT
TRAVELING PATH ESTIMATION UNIT
FIRST IN-TRAVELING PATH DETERMINATION UNIT
404
412
309
SENSOR FUSION UNIT
413
310
INFORMATION FUSING UNIT
VEHICLE DETECTION FUSING UNIT
311
THIRD INTER-OBJECT RELATIONSHIP CALCULATION UNIT
THIRD IN-TRAVELING ROAD DETERMINATION UNIT
312
RELATIONSHIP INTEGRATION DETERMINATION UNIT
IN-TRAVELING PATH INTEGRATION DETERMINATION UNIT
306
411
RADAR ANALYSIS UNIT
307
SECOND OBJECT DETECTION UNIT
308
SECOND INTER-OBJECT RELATIONSHIP CALCULATION UNIT
405
SECOND VEHICLE DETECTION UNIT
SECOND IN-TRAVELING ROAD DETERMINATION UNIT
414
407
408
409
415
406
VEHICLE INFORMATION ACQUISITION DEVICE
313

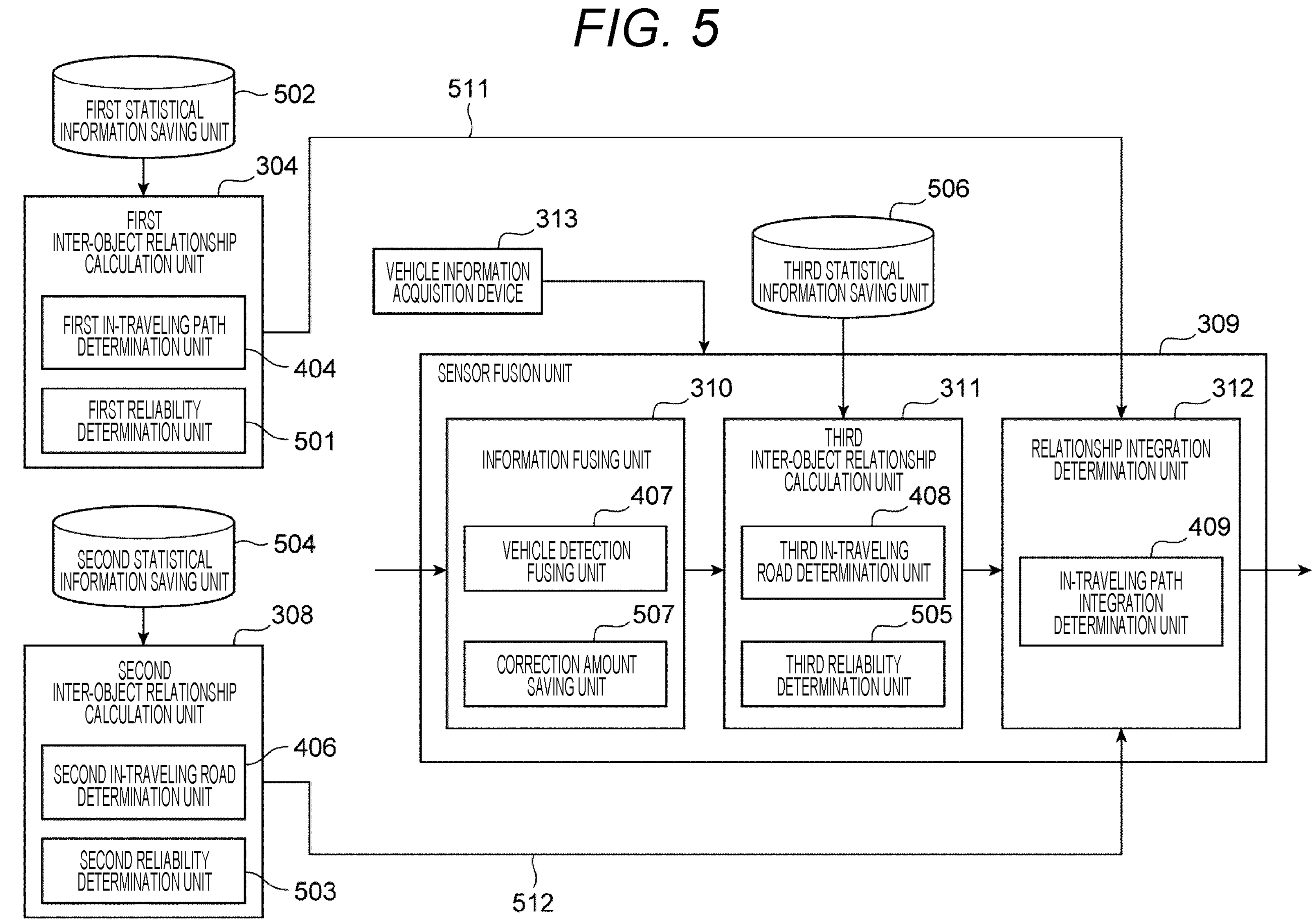
FIG. 5
FIRST STATISTICAL INFORMATION SAVING UNIT
502
511
304
FIRST INTER-OBJECT RELATIONSHIP CALCULATION UNIT
FIRST IN-TRAVELING PATH DETERMINATION UNIT
404
FIRST RELIABILITY DETERMINATION UNIT
501
VEHICLE INFORMATION ACQUISITION DEVICE
313
THIRD STATISTICAL INFORMATION SAVING UNIT
506
309
SENSOR FUSION UNIT
310
INFORMATION FUSING UNIT
407
VEHICLE DETECTION FUSING UNIT
507
CORRECTION AMOUNT SAVING UNIT
311
THIRD INTER-OBJECT RELATIONSHIP CALCULATION UNIT
408
THIRD IN-TRAVELING ROAD DETERMINATION UNIT
505
THIRD RELIABILITY DETERMINATION UNIT
312
RELATIONSHIP INTEGRATION DETERMINATION UNIT
409
IN-TRAVELING PATH INTEGRATION DETERMINATION UNIT
SECOND STATISTICAL INFORMATION SAVING UNIT
504
308
SECOND INTER-OBJECT RELATIONSHIP CALCULATION UNIT
SECOND IN-TRAVELING ROAD DETERMINATION UNIT
406
SECOND RELIABILITY DETERMINATION UNIT
503
512

FIG. 6

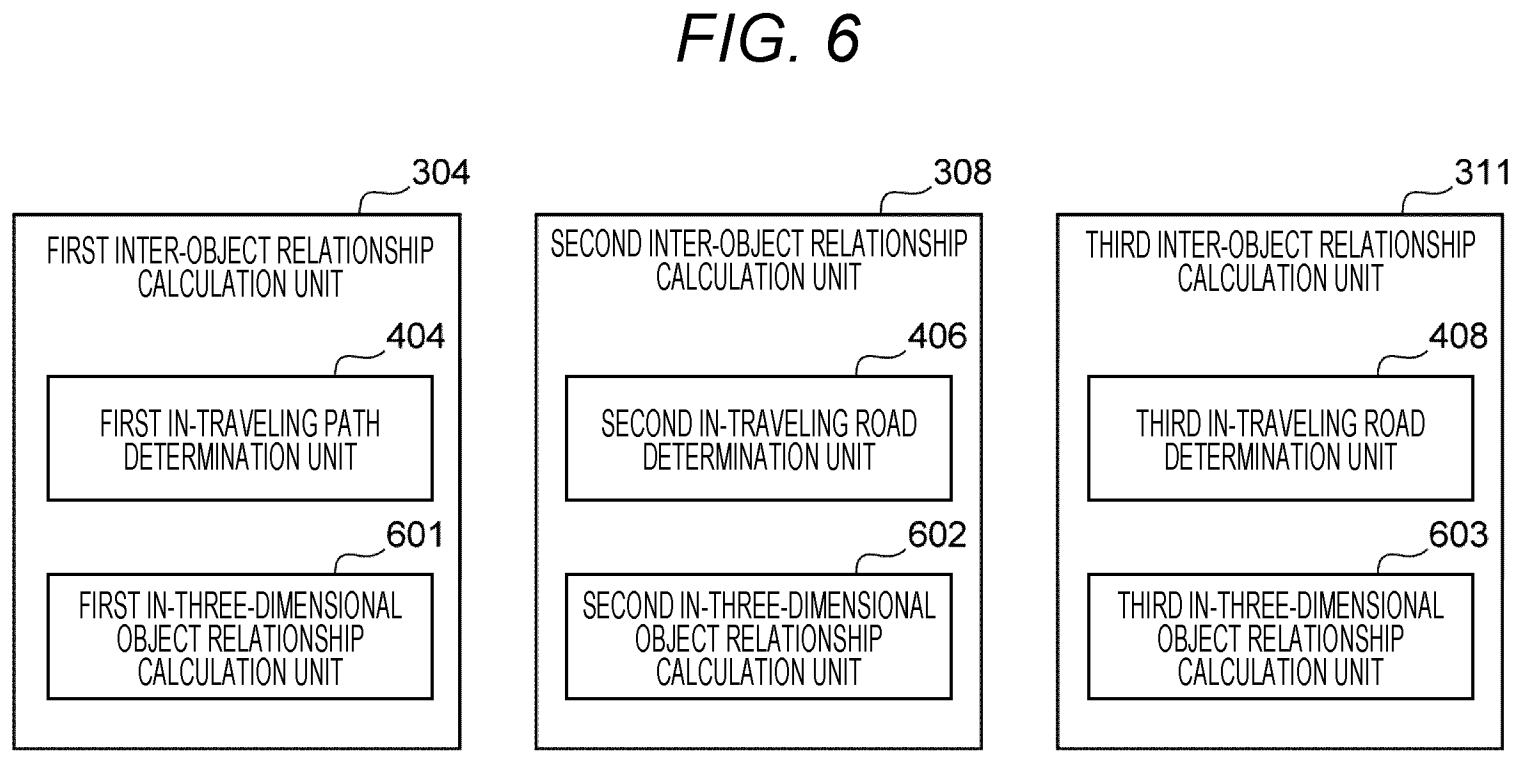

304 FIRST INTER-OBJECT RELATIONSHIP CALCULATION UNIT

404 FIRST IN-TRAVELING PATH DETERMINATION UNIT

601 FIRST IN-THREE-DIMENSIONAL OBJECT RELATIONSHIP CALCULATION UNIT

308 SECOND INTER-OBJECT RELATIONSHIP CALCULATION UNIT

406 SECOND IN-TRAVELING ROAD DETERMINATION UNIT

602 SECOND IN-THREE-DIMENSIONAL OBJECT RELATIONSHIP CALCULATION UNIT

311 THIRD INTER-OBJECT RELATIONSHIP CALCULATION UNIT

408 THIRD IN-TRAVELING ROAD DETERMINATION UNIT

603 THIRD IN-THREE-DIMENSIONAL OBJECT RELATIONSHIP CALCULATION UNIT

705

| | 701 | 702 | 703 | 704 |
|---|---|---|---|---|
| 701 | / | -20 | -30 | 0 |
| 702 | / | / | -10 | 20 |
| 703 | / | / | / | 30 |
| 704 | / | / | / | / |

706

| | 701 | 702 | 703 | 704 |
|---|---|---|---|---|
| 701 | / | -10 | -5 | 0 |
| 702 | / | / | 5 | 10 |
| 703 | / | / | / | 5 |
| 704 | / | / | / | / |

707

| | 701 | 702 | 703 | 704 |
|---|---|---|---|---|
| 701 | / | -12 | -10 | 0 |
| 702 | / | / | 2 | 12 |
| 703 | / | / | / | 10 |
| 704 | / | / | / | / |

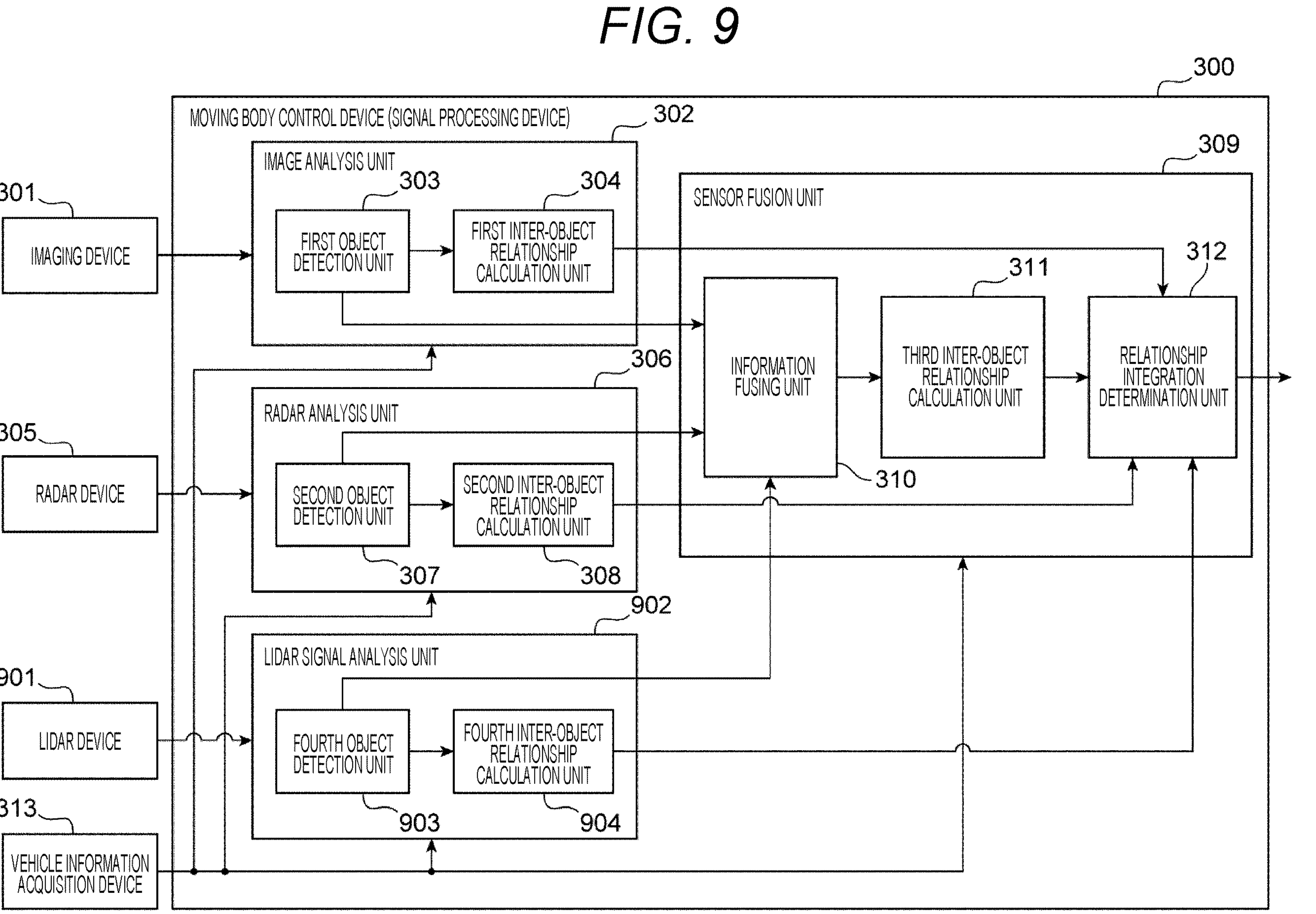
FIG. 9
300
MOVING BODY CONTROL DEVICE (SIGNAL PROCESSING DEVICE)
302
IMAGE ANALYSIS UNIT
303
FIRST OBJECT DETECTION UNIT
304
FIRST INTER-OBJECT RELATIONSHIP CALCULATION UNIT
306
RADAR ANALYSIS UNIT
307
SECOND OBJECT DETECTION UNIT
308
SECOND INTER-OBJECT RELATIONSHIP CALCULATION UNIT
902
LIDAR SIGNAL ANALYSIS UNIT
903
FOURTH OBJECT DETECTION UNIT
904
FOURTH INTER-OBJECT RELATIONSHIP CALCULATION UNIT
309
SENSOR FUSION UNIT
310
INFORMATION FUSING UNIT
311
THIRD INTER-OBJECT RELATIONSHIP CALCULATION UNIT
312
RELATIONSHIP INTEGRATION DETERMINATION UNIT
301
IMAGING DEVICE
305
RADAR DEVICE
901
LIDAR DEVICE
313
VEHICLE INFORMATION ACQUISITION DEVICE

FIG. 11

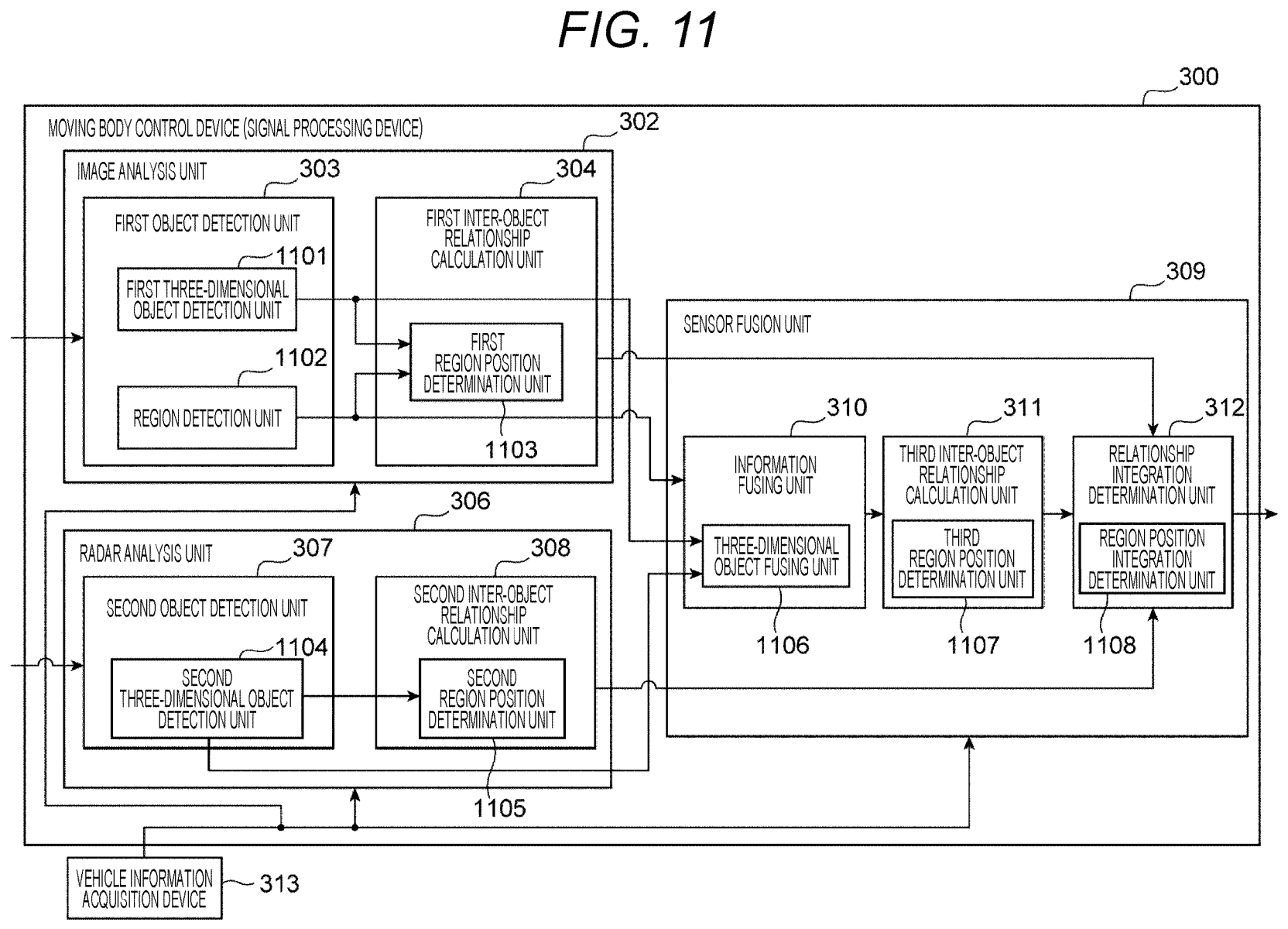

300
MOVING BODY CONTROL DEVICE (SIGNAL PROCESSING DEVICE)
302
IMAGE ANALYSIS UNIT
303
FIRST OBJECT DETECTION UNIT
1101
FIRST THREE-DIMENSIONAL OBJECT DETECTION UNIT
1102
REGION DETECTION UNIT
304
FIRST INTER-OBJECT RELATIONSHIP CALCULATION UNIT
1103
FIRST REGION POSITION DETERMINATION UNIT
306
RADAR ANALYSIS UNIT
307
SECOND OBJECT DETECTION UNIT
1104
SECOND THREE-DIMENSIONAL OBJECT DETECTION UNIT
308
SECOND INTER-OBJECT RELATIONSHIP CALCULATION UNIT
1105
SECOND REGION POSITION DETERMINATION UNIT
309
SENSOR FUSION UNIT
310
INFORMATION FUSING UNIT
1106
THREE-DIMENSIONAL OBJECT FUSING UNIT
311
THIRD INTER-OBJECT RELATIONSHIP CALCULATION UNIT
1107
THIRD REGION POSITION DETERMINATION UNIT
312
RELATIONSHIP INTEGRATION DETERMINATION UNIT
1108
REGION POSITION INTEGRATION DETERMINATION UNIT
313
VEHICLE INFORMATION ACQUISITION DEVICE

SIGNAL PROCESSING DEVICE

TECHNICAL FIELD

The present invention relates to a signal processing device suitable for a system that highly understands a surrounding environment in automatic driving and an advanced safety driving support system.

BACKGROUND ART

In achievement of automatic driving and an advanced safety driving support system, importance of a sensor that monitors the outside world and detects an object necessary for host vehicle travel such as an obstacle and lane information is increasing.

In particular, there is a technique for improving the performance of the entire system by combining a plurality of sensors mounted on the host vehicle in order to improve the detection performance. For example, a detection result by a camera is generally known to have relatively high accuracy in direction up to the detected object but low accuracy in distance. On the other hand, the detection result by the millimeter-wave radar is known to have high accuracy in distance but low accuracy in direction. Therefore, there is known a technique of improving the performance as a system by employing a highly accurate detection result by combining detection results of a camera and a millimeter-wave radar or using a sensor fusion technique for stochastically synthesizing detection results.

Important functions among the functions using such system include determination as to whether or not the detected vehicle or pedestrian is on the traveling path of the host vehicle. For example, for active cruise control (ACC) that follows a preceding vehicle, it is necessary to determine a detection situation of a preceding vehicle and a white line around the vehicle and select a vehicle that the host vehicle follows. If it is erroneously determined whether or not the preceding vehicle is in the host vehicle lane, there is a possibility that erroneous acceleration or deceleration occurs, such as following the vehicle in an adjacent lane or accelerating even though there is a preceding vehicle. The same applies to automatic emergency braking (AEB) that operates when there is an obstacle ahead.

For example, PTL 1 discloses a technique for determining whereabouts of another vehicle on a traveling road or an adjacent lane on the basis of a surrounding situation detected using a camera and a radar distance measuring device.

CITATION LIST

Patent Literature

PTL 1: Japanese Patent No. 5145986

SUMMARY OF INVENTION

Technical Problem

In sensor fusion, there is a characteristic of each sensor, and there is asymmetry with respect to a detected object that a certain sensor can detect an object but another sensor cannot detect the object. For example, the camera can detect a vehicle and a white line, meanwhile the millimeter-wave radar can detect a vehicle but has difficulty in detecting a white line. There is a difference based on the measurement principle also regarding the measurement distance to the object. For example, in general, the camera is relatively more accurate than a millimeter-wave radar regarding the direction to a detected object. However, from the viewpoint of distance accuracy to the detected object, the millimeter-wave radar is superior to the camera. Therefore, when sensor fusion is performed, by taking advantage of sensor characteristics of each other, in a case where a certain vehicle is detected by a millimeter-wave radar and a camera, the millimeter-wave radar is adopted for the distance, and the camera is adopted for the direction.

However, since there is a difference as described above between the camera and the millimeter-wave radar with respect to an object that can be detected, even if a correct distance is obtained after fusion with respect to a vehicle, detection by the millimeter-wave radar is not a target with respect to a white line, and thus there is no data to be a fusion target. Therefore, when the relationship between the position of the white line detected by the camera and the position of the vehicle subjected to fusion is determined on the basis of the positions of the both, there is a case where the determination is erroneous as compared with the case of determination only with the camera. That is, since the detection objects are different in the plurality of sensors, it is a problem how to correctly obtain the relationship between the position of a non-shared detection object and the position of a shared detection object after fusion.

The present invention has been made in view of the above problems, and an object thereof is to provide a signal processing device with which, even when detection objects differ among a plurality of sensors, it is possible to correctly obtain the relationship between a non-shared detection object and a detection object that is shared after fusion.

Solution to Problem

In order to solve the above problems, a signal processing device according to the present invention is characterized by recognizing a first object and a second object from an image captured by an imaging device, and storing a first positional relationship between the first object and the second object, obtaining a position of the first object from information of the first object recognized on the basis of information obtained from a sensor different from the imaging device and information of the first object recognized on the basis of an image captured by the imaging device, obtaining a second positional relationship between the obtained first object and the second object recognized on the basis of an image captured by the imaging device, and comparing the first positional relationship with the second positional relationship to determine a final positional relationship between the first object and the second object.

Advantageous Effects of Invention

According to the present invention, even when detection objects differ among a plurality of sensors, it is possible to correctly obtain the relationship between a non-shared detection object and a detection object that is shared after fusion.

Problems, configurations, and effects other than those described above will be made clear by the description of the following embodiment.

BRIEF DESCRIPTION OF DRAWINGS

FIG. 2 is a view describing a positional relationship between a white line and a preceding vehicle in a preceding vehicle following system.

FIG. 3 is a view describing an overall configuration of a moving body control device that is an embodiment of a signal processing device according to the present invention.

FIG. 4 is a view describing a configuration having an in-traveling path determination function in the specific example of FIG. 3.

FIG. 5 is a view describing a configuration having a reliability determination function with respect to FIG. 4.

FIG. 6 is a view describing a configuration for calculating a relationship of three-dimensional objects with respect to FIG. 4.

FIG. 9 is a view describing a configuration example in a case where a LIDAR device is added.

FIG. 11 is a view describing a configuration example of calculating a relationship with a road region.

DESCRIPTION OF EMBODIMENT

Figure 1:
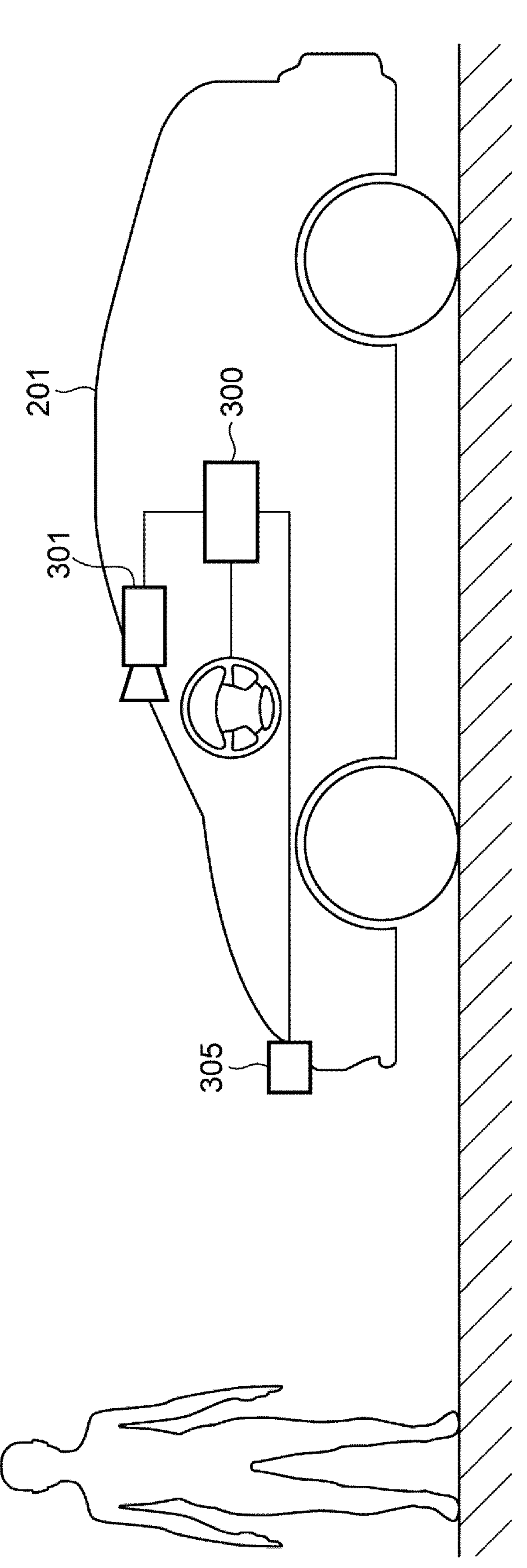
FIG. 1 is a view describing a vehicle control system including a moving body control device that is an embodiment of a signal processing device according to the present invention.

Hereinafter, an embodiment of the present invention will be described with reference to the drawings. In the drawings for describing the embodiment of the invention, parts having the same functions are denoted by the same reference signs, and repeated description thereof will be omitted.

FIG. 1 illustrates a vehicle control system using an imaging device (camera or the like) and a radar device (millimeter-wave radar or the like) as sensors for detecting an object.

An imaging device 301 and a radar device 305 are mounted on a vehicle (hereinafter, sometimes referred to as host vehicle) 201 as a moving body, detect an object 200 preceding the host vehicle 201, for example, and measure and transmit, to a moving body control device 300, a distance to the object 200 and a relative speed. The moving body control device 300 determines control of a brake or an accelerator from the distance to the object 200 and the relative speed, and controls the vehicle 201. Alternatively, according to the risk level or meaning of the detected object 200, information regarding it is notified to the driver through a warning sound or display.

Figure 2:
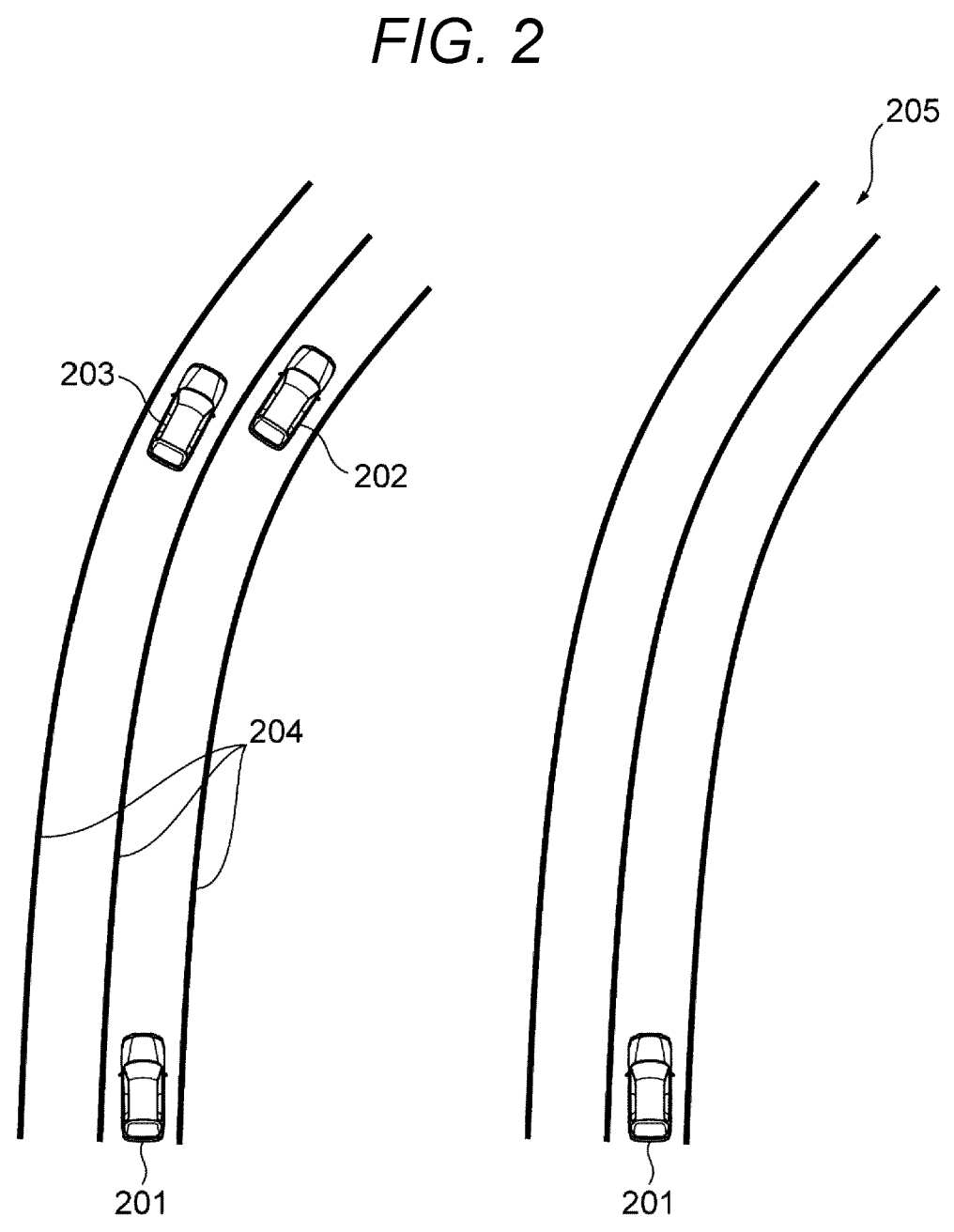

A preceding vehicle following system (also referred to as ACC) among functions of the vehicle control system is illustrated in FIG. 2. The imaging device 301 and the radar device 305 mounted on the host vehicle 201 detect preceding vehicles 202 and 203. In addition, the imaging device 301 detects a white line group 204 drawn in front of the host vehicle and estimates a region (lane) where the host vehicle 201 travels. Using the relationship between this lane and the objects 202 and 203 detected by the imaging device 301 or the radar device 305, the moving body control device 300 determines as to which of preceding vehicles to follow or whether not to follow any vehicle. In FIG. 2, since the preceding vehicle 202 is a vehicle on a lane (also referred to as host vehicle lane) of the host vehicle 201, the preceding vehicle 202 is followed as a target to follow. On the other hand, since the preceding vehicle 203 is not on the lane of the host vehicle 201, it is not a target to follow. As another example, in a case where there is no preceding vehicle such as 205, there is no target to follow.

Moving Body Control Device 300

FIG. 3 illustrates an overall configuration of the moving body control device 300, which is an embodiment of the signal processing device for carrying out the present invention. The moving body control device (signal processing device) 300 mainly includes an image analysis unit 302 that analyzes an image captured by the imaging device 301, a radar analysis unit 306 that analyzes information obtained from the radar device 305 (a sensor different from the imaging device 301), and a sensor fusion unit 309 that integrates the information obtained from the image analysis unit 302 and the radar analysis unit 306 and determines and outputs a final result.

Image Analysis Unit 302

The imaging device 301 transmits its image signal to the image analysis unit 302 of the moving body control device 300. The image analysis unit 302 detects (recognizes) an object (or object group) such as a vehicle, a pedestrian, a sign, or a white line from the image by a first object detection unit 303 (hereinafter, simply referred to as object detection unit 303). The image analysis unit 302 includes a first inter-object relationship calculation unit 304 (hereinafter, simply referred to as inter-object relationship calculation unit 304) that saves (stores) the relationship between the objects detected by the object detection unit 303. For example, as illustrated in FIG. 2, the relationship between the objects saved here includes information as to which of inside or outside of the host vehicle lane the detected vehicle is present, and a relative distance and a relative speed between the detected objects.

Radar Analysis Unit 306

Similarly, the radar device 305 transmits its radar signal to the radar analysis unit 306 of the moving body control device 300. The radar analysis unit 306 detects (recognizes) an object (or object group) such as a vehicle or a pedestrian from the radar signal by a second object detection unit 307 (hereinafter, simply referred to as object detection unit 307). The radar analysis unit 306 includes a second inter-object relationship calculation unit 308 (hereinafter, simply referred to as inter-object relationship calculation unit 308) that saves (stores) the relationship between the objects detected by the object detection unit 307.

Sensor Fusion Unit 309

The results of the objects detected by the image analysis unit 302 and the radar analysis unit 306 are transmitted to the sensor fusion unit 309. The results commonly detected by both (the object detection unit 303 of) the image analysis unit 302 and (the object detection unit 307 of) the radar analysis unit 306 are sent to an information fusing unit 310 of the sensor fusion unit 309, and the detection results are fused. The fusion method is a known technique. In general, whether or not objects detected by sensors are the same object is determined according to sensor characteristics and reliability of a position of each detection result, and then a distance of a corresponding object determined as the same object is output as a result of the information fusing unit 310 by recalculating the distance using two distances according to the sensor characteristics, the position of each detection result, its estimation error, and reliability or adopting a value (distance) of one sensor output.

Thereafter, the sensor fusion unit 309 calculates a relationship with respect to the detection result fused by the information fusing unit 310 in a third inter-object relationship calculation unit 311 (hereinafter, simply referred to as inter-object relationship calculation unit 311). It is highly possible that the object information input to the information fusing unit 310 differs particularly in distance between the result output from the image analysis unit 302 and the result output by the radar analysis unit 306. When those pieces of information are fused, distance information and the like of the object are corrected, and therefore there is a possibility that the result of information fusion (that is, the result saved in the inter-object relationship calculation unit 311) is different from the results saved in the inter-object relationship calculation unit 304 and the inter-object relationship calculation unit 308. Therefore, the sensor fusion unit 309 integrally determines, in the relationship integration determination unit 312, the results of the inter-object relationship calculation unit 304 of the image analysis unit 302, the inter-object relationship calculation unit 308 of the radar analysis unit 306, and the inter-object relationship calculation unit 311 of the sensor fusion unit 309, and outputs a final relationship between the objects. The reliability of the final relationship may be output from the determination process of the relationship.

Note that, the inter-object relationship calculation unit 304 and the inter-object relationship calculation unit 308 are placed here in the image analysis unit 302 and the radar analysis unit 306, respectively, but this function is to receive the result of object detection and it is not a problem if the function is on the sensor fusion unit 309 side. Vehicle information such as a steering angle, a yaw rate, and a vehicle speed acquired by a vehicle information acquisition device 313 may be received and used for each analysis and detection. The vehicle information acquisition device 313 includes a steering angle sensor, a gyro sensor, a wheel speed sensor, and the like mounted on the vehicle, for example.

Specific Example of Moving Body Control Device 300

A simple configuration that is the specific example of FIG. 3 is illustrated in FIG. 4 on the basis of the in-traveling path determination function of FIG. 2.

Image Analysis Unit 302

The object detection unit 303 of the image analysis unit 302 includes a white line detection unit 401 that detects (recognizes) a position of a white line, a first vehicle detection unit 402 (hereinafter, simply referred to as vehicle detection unit 402) that detects (recognizes) a position of a vehicle (here, a preceding vehicle), and a traveling path estimation unit 403 that estimates (recognizes) a region (lane) of a traveling path in front of the host vehicle from the white line detection unit 401. The inter-object relationship calculation unit 304 includes a first in-traveling path determination unit 404 (hereinafter, simply referred to as in-traveling path determination unit 404) that determines as to which of inside or outside of the traveling path the detected vehicle is present (that is, relative positional relationship) from the result of the detected position of the vehicle detection unit 402 and the result of the estimated position of the traveling path estimation unit 403. This will be described with reference to FIG. 2. In the case of the preceding vehicle 202, the preceding vehicle 202 is determined to be inside the traveling path, and in the case of the preceding vehicle 203, the preceding vehicle 203 is determined to be outside the traveling path. For the determination of inside of the traveling path, information such as a steering angle and a yaw rate of the host vehicle acquired by the vehicle information acquisition device 313 may be used. A result 411 of the vehicle detection unit 402, results 413 of the white line detection unit 401 and the traveling path estimation unit 403, and a result 412 of the in-traveling path determination unit 404 are transmitted to the sensor fusion unit 309.

Radar Analysis Unit 306

The object detection unit 307 of the radar analysis unit 306 includes a second vehicle detection unit 405 (hereinafter, simply referred to as vehicle detection unit 405) that detects (recognizes) a position of a vehicle (here, a preceding vehicle). Instead of the radar device 305 not having a function of white line detection, here, the inter-object relationship calculation unit 308 includes a second in-traveling path determination unit 406 (hereinafter, simply referred to as in-traveling path determination unit 406) that estimates (recognizes) a traveling path from information such as a steering angle and a yaw rate of the host vehicle acquired by the vehicle information acquisition device 313 and determines whether or not the vehicle detection result of the vehicle detection unit 405 is inside the estimated traveling path (that is, relative positional relationship). A result 415 of the vehicle detection unit 405 and a result 414 of the in-traveling path determination unit 406 are transmitted to the sensor fusion unit 309.

Sensor Fusion Unit 309

The information fusing unit 310 of the sensor fusion unit 309 includes the vehicle detection fusing unit 407 that collates the vehicle detection results (411 and 415) detected by (the vehicle detection unit 402 of) the image analysis unit 302 and (the vehicle detection unit 405 of) the radar analysis unit 306, fuses the vehicle detection results determined to be the same, and outputs its position as one vehicle detection result. Normally, since the detection accuracy of the imaging device (camera or the like) 301 and the detection accuracy of the radar device (millimeter-wave radar or the like) 305 are different, distances output from the vehicle detection unit 402, the vehicle detection unit 405, and the vehicle detection fusing unit 407 are different from one another in many cases. The inter-object relationship calculation unit 311 of the sensor fusion unit 309 includes a third in-traveling path determination unit 408 (hereinafter, simply referred to as in-traveling path determination unit 408) that determines as to which of inside or outside of the traveling path the vehicle obtained by fusion again from the result corrected by the vehicle detection fusing unit 407 and the result 413 of the white line detection unit 401 or the traveling path estimation unit 403 is present (that is, relative positional relationship).

Upon receiving the result 412 of the in-traveling path determination unit 404, the result 414 of the in-traveling path determination unit 406, and the result of the in-traveling path determination unit 408, the relationship integration determination unit 312 performs more probable inside and outside determination by an in-traveling path integration determination unit 409 from the determination results of one another, and outputs a determination result of a final relationship. For example, when the results of the in-traveling path determination unit 404, the in-traveling path determination unit 406, and the in-traveling path determination unit 408 match, the determination result is output as it is. However, in a case where the results of the in-traveling path determination do not match one another and in a case where a white line can be detected, the imaging device (camera or the like) 301 is regarded to be higher in reliability than the radar device (millimeter-wave radar or the like) 305, and the result of the in-traveling path determination unit 404 is prioritized, for example. In determination such as when the white line is not visible, the result of the in-traveling path determination unit 406 or the in-traveling path determination unit 408 is prioritized, for example.

Although the detection of a white line and a vehicle has been focused in the above, the white line may be replaced with, for example, a travelable region, a road edge, a road side strip, or the like, and the vehicle may be replaced with, for example, a pedestrian, a bicycle, or the like. The in-traveling path integration determination unit 409 may output reliability for the final relationship from the determination process. For example, in a case where the results of the in-traveling path determination units (404, 406, and 408) are different from one another, it is conceivable to output the value of reliability low even if it is determined that the vehicle obtained by fusion as the final determination is inside the traveling path.

Reliability Determination

FIG. 5 is a view describing the configuration in which determination is performed by providing a concept of reliability with respect to FIG. 4.

Image Analysis Unit 302

In the inter-object relationship calculation unit 304 of the image analysis unit 302, a first reliability determination unit 501 (hereinafter, simply referred to as reliability determination unit 501) determines the reliability of whether or not a target vehicle is inside the traveling path (inside/outside traveling path determination) from time-series stability, distance reliability, and the like on the basis of the position of the white line and the position of the vehicle. Here, as the time-series stability, for example, it is conceivable that the reliability is low in a case where determination in each frame fluctuates inside and outside the white line position, and the reliability is high in a case where determination is constant inside or outside the white line position or in a case where the determination fluctuates stepwise with a lane change. The reliability of distance is determined according to a sensor to be used or a detected state. For example, in general distance measurement using a camera, a measurement error increases in accordance with an increase in distance from the host vehicle to the object. If the amount of the measurement error is read as the reliability, it is conceivable to change the reliability by a polynomial with the distance from the host vehicle to the object as a variable. For example, the reliability determination unit 501 may make a determination from information included in a first statistical information saving unit 502 having a success rate evaluated in advance or the like.

Radar Analysis Unit 306

Similarly, in the inter-object relationship calculation unit 308 of the radar analysis unit 306, a second reliability determination unit 503 (hereinafter, simply referred to as reliability determination unit 503) determines the reliability of whether or not a target vehicle is inside the traveling path (inside/outside traveling path determination) from time-series stability, distance reliability, and the like on the basis of the host vehicle behavior and the position of the vehicle. For example, the reliability determination unit 503 may make a determination from information included in a second statistical information saving unit 504 having a success rate evaluated in advance or the like.

Sensor Fusion Unit 309

The information fusing unit 310 in the sensor fusion unit 309 upon receiving those determination results and reliabilities includes a correction amount saving unit 507 that saves the amount obtained by correcting the distance of the vehicle regarded as the same when the vehicle information is fused by the vehicle detection fusing unit 407 described above, and transmits this correction amount to the inter-object relationship calculation unit 311.

In the inter-object relationship calculation unit 311, a third reliability determination unit 505 (hereinafter, simply referred to as reliability determination unit 505) determines the reliability of the in-traveling path determination unit 408 from the correction amount. The determination of the reliability determination unit 505 may also use information included in a third statistical information saving unit 506 having a success rate evaluated in advance or the like.

In the relationship integration determination unit 312, the in-traveling path integration determination unit 409 determines as to which in-traveling path determination result to adopt from the magnitude (by comparing the magnitude) of a result (reliability) 511 of the reliability determination unit 501 of the inter-object relationship calculation unit 304, a result (reliability) 512 of the reliability determination unit 503 of the inter-object relationship calculation unit 308, and a result (reliability) of the reliability determination unit 505 of the inter-object relationship calculation unit 311. The reliability of the final relationship may be output from the determination process of the relationship. For example, in a case where the results of the reliability determination units (501, 503, and 505) are different from one another, it is conceivable to output the value of reliability low even if it is determined that the vehicle obtained by fusion as the final determination is inside the traveling path.

Calculation of Relationship Between Three-Dimensional Objects

FIG. 6 is a view describing the configuration for using the relationship between three-dimensional objects with respect to FIG. 4 for determination.

Image Analysis Unit 302

Here, the inter-object relationship calculation unit 304 of the image analysis unit 302 includes a unit that saves not only the relationship between a white line and a vehicle but also the relationship with another object. For example, in a case where a plurality of vehicles are detected, a first in-three-dimensional object relationship calculation unit 601 (hereinafter, simply referred to as in-three-dimensional object relationship calculation unit 601) that calculates a relative distance, a front-rear relationship, and the like among the plurality of detected vehicles is included. Here, the vehicle may be a bicycle or a pedestrian instead, and the relationship is not limited to the same type of objects, and may be a relative distance or a front-rear relationship between different types of three-dimensional objects such as a vehicle and a pedestrian, a vehicle and a bicycle, and the like. That is, here, in a case where a plurality of vehicles and white lines (that is, a vehicle group and a white line group) are detected, for example, (the inter-in-three-dimensional object relationship calculation unit 601 of) the inter-object relationship calculation unit 304 saves (stores) the relative positional relationship among the plurality of recognized vehicles of the vehicle group and the plurality of recognized white lines of the white line group as well as between the vehicle group and the white line group (see also Table 705 in FIG. 7).

Radar analysis unit 306

Similarly, the inter-object relationship calculation unit 308 of the radar analysis unit 306 includes a second in-three-dimensional object relationship calculation unit 602 (hereinafter, simply referred to as in-three-dimensional object relationship calculation unit 602) that has a function of calculating a relative distance, a front-rear relationship, and the like among the plurality of detected vehicles is included. That is, here, in a case where a plurality of vehicles (that is, a vehicle group) are detected, for example, (the inter-in-three-dimensional object relationship calculation unit 602 of) the inter-object relationship calculation unit 308 saves (stores) information on the vehicle group and the relative positional relationship among the plurality of vehicles of the vehicle group (see also Table 706 in FIG. 7).

Here, the in-three-dimensional object relationship calculation unit 601 and the in-three-dimensional object relationship calculation unit 602 are assumed to save the front-back distance between the detected three-dimensional objects. The front-rear relationship and the like may be saved in a more symbolic manner.

Sensor Fusion Unit 309

The relationship calculated in this manner is also saved between objects after the information fusing unit 310 of the sensor fusion unit 309. This processing is performed by a third in-three-dimensional object relationship calculation unit 603 (hereinafter, simply referred to as in-three-dimensional object relationship calculation unit 603) of the inter-object relationship calculation unit 311. In this case, (the vehicle detection fusing unit 407 of) the information fusing unit 310 fuses a vehicle group detection result detected by (the vehicle detection unit 402 of) the image analysis unit 302 and a vehicle group detection result detected by (the vehicle detection unit 405 of) the radar analysis unit 306, and outputs its position as one vehicle group detection result. The in-three-dimensional object relationship calculation unit 603 saves (stores) the relative positional relationship between the vehicle group corrected by (the vehicle detection fusing unit 407 of) the information fusing unit 310 and the white line group that is the result 413 of the white line detection unit 401 or the traveling path estimation unit 403 (see also Table 707 in FIG. 7).

In the relationship integration determination unit 312 after the inter-object relationship calculation unit 311, the in-traveling path integration determination unit 409 compares these in-three-dimensional object relationships (for example, the reliability given or calculated regarding the in-three-dimensional object relationship described with reference to FIG. 5), determines whether the current target object is present inside or present outside the traveling path, and outputs a determination result of a final relationship.

Figure 7:
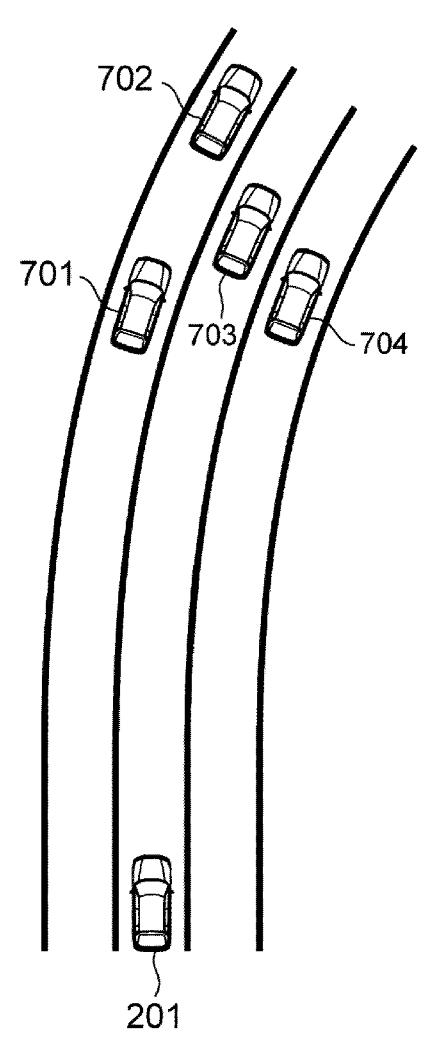
FIG. 7 is a view describing a calculation example of a relationship of a three-dimensional object.

FIG. 7 illustrates a calculation example of the relationship of three-dimensional objects calculated by the in-three-dimensional object relationship calculation unit 601 and the in-three-dimensional object relationship calculation unit 602.

Now, it is assumed that when a preceding vehicle 701, a preceding vehicle 702, a preceding vehicle 703, and a preceding vehicle 704 are detected by the imaging device 301 mounted on the vehicle 201, the distances are detected at 70 m, 90 m, 100 m, and 70 m, respectively. The in-three-dimensional object relationship calculation unit 601 calculates and saves the distance difference. Here, Table 705 of 4 rows and 4 columns saving all relationships saves each distance difference. Note that, in order to save the amount of calculation and the amount of memory, the relationship may be limited to the relationship between simply adjacent objects.

On the other hand, it is assumed that the radar device 305 mounted on the vehicle 201 has detected the distances at 75 m, 85 m, 80 m, and 75 m, respectively. The in-three-dimensional object relationship calculation unit 602 calculates and saves the distance difference. Here, similarly to the imaging device 301, Table 706 of 4 rows and 4 columns for saving all relationships is defined. However, as described above, the format of the table is not limited as long as relationships are saved.

Thereafter, distances are fused by the information fusing unit 310 of the sensor fusion unit 309, and a result of distance correction is indicated. It is assumed that the information fusing unit 310 trusts more the detection result by the radar analysis unit 306, and the respective distances are corrected to 74 m, 86 m, 84 m, and 74 m. In this regard, a table in which the relationship is recalculated by the in-three-dimensional object relationship calculation unit 603 is indicated in 707.

In response to this result, (the in-traveling path integration determination unit 409 of) the relationship integration determination unit 312 makes a determination as follows, for example. Focusing only on the signs of the elements in each table illustrated in FIG. 7, the signs are reversed in Table 705 and Table 706 as well as Table 705 and Table 707 only regarding the relationship between 703 and 702. Therefore, the relationship integration determination unit 312 regards that the input of the relationship from the image analysis unit 302 is low in reliability for Table 705, and trusts the value output from the radar analysis unit 306 or the information fusing unit 310 of the sensor fusion unit 309 in the in-traveling path integration determination unit 409 regarding it to be high in reliability. Due to this, it is determined whether the current target object is present inside or present outside the traveling path, and a determination result of a final relationship is output.

Abnormality Detection and Notification

Figure 8:
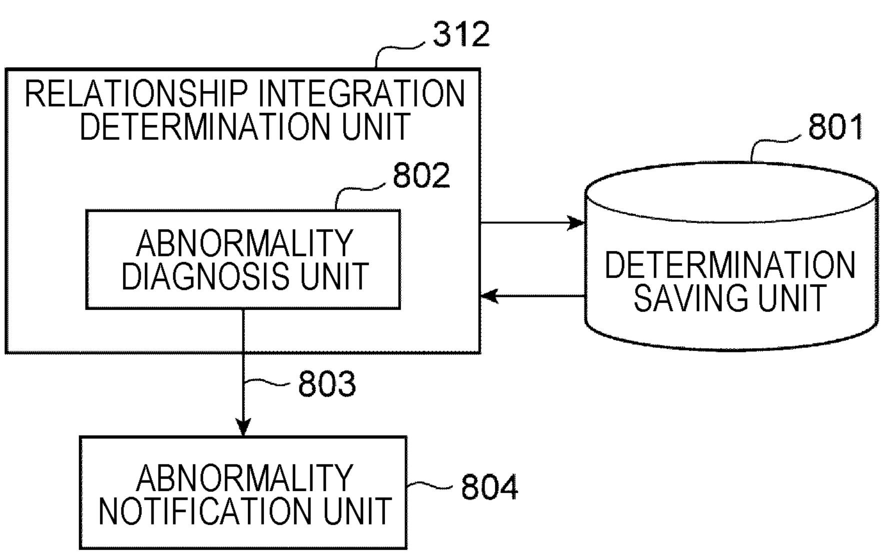
FIG. 8 is a view describing a configuration example having an abnormality detection function based on a relationship.

FIG. 8 illustrates a configuration example of detecting and notifying an abnormality of a sensor system on the basis of determination of a relationship.

A result of the relationship integration determination unit 312 and results of the inter-object relationship calculation units (304, 308, and 311) in respective sensors are accumulated (stored) in a determination saving unit 801. In a case where the number of times determinations of relationships in respective pieces of sensor information are different from one another exceeds a prescribed value or the number of times they are greatly different from one another by a threshold or more exceeds a prescribed value, an abnormality diagnosis unit 802 determines that as a sensor abnormality (signal abnormality) and notifies the result by transmitting an abnormality signal 803 to an abnormality notification unit 804. Here, the abnormality notification unit 804 is conceivable to be a display device such as a display or a diagnosis device on a microcomputer.

The present configuration described above is not limited to the radar device 305 and the imaging device 301, and, as illustrated in FIG. 9, can also be applied to a configuration using another sensor such as a LIDAR device or a configuration using another imaging device or a radar device. In the example illustrated in FIG. 9, a LIDAR device 901 transmits its signal to a LIDAR signal analysis unit 902 of the moving body control device 300. The LIDAR signal analysis unit 902 receives a result of a fourth object detection unit 903, calculates a relationship between objects by a fourth inter-object relationship calculation unit 904, transmits the result to the sensor fusion unit 309, and also analyzes the entire relationship by the relationship integration determination unit 312 to make a final output.

Figure 10:
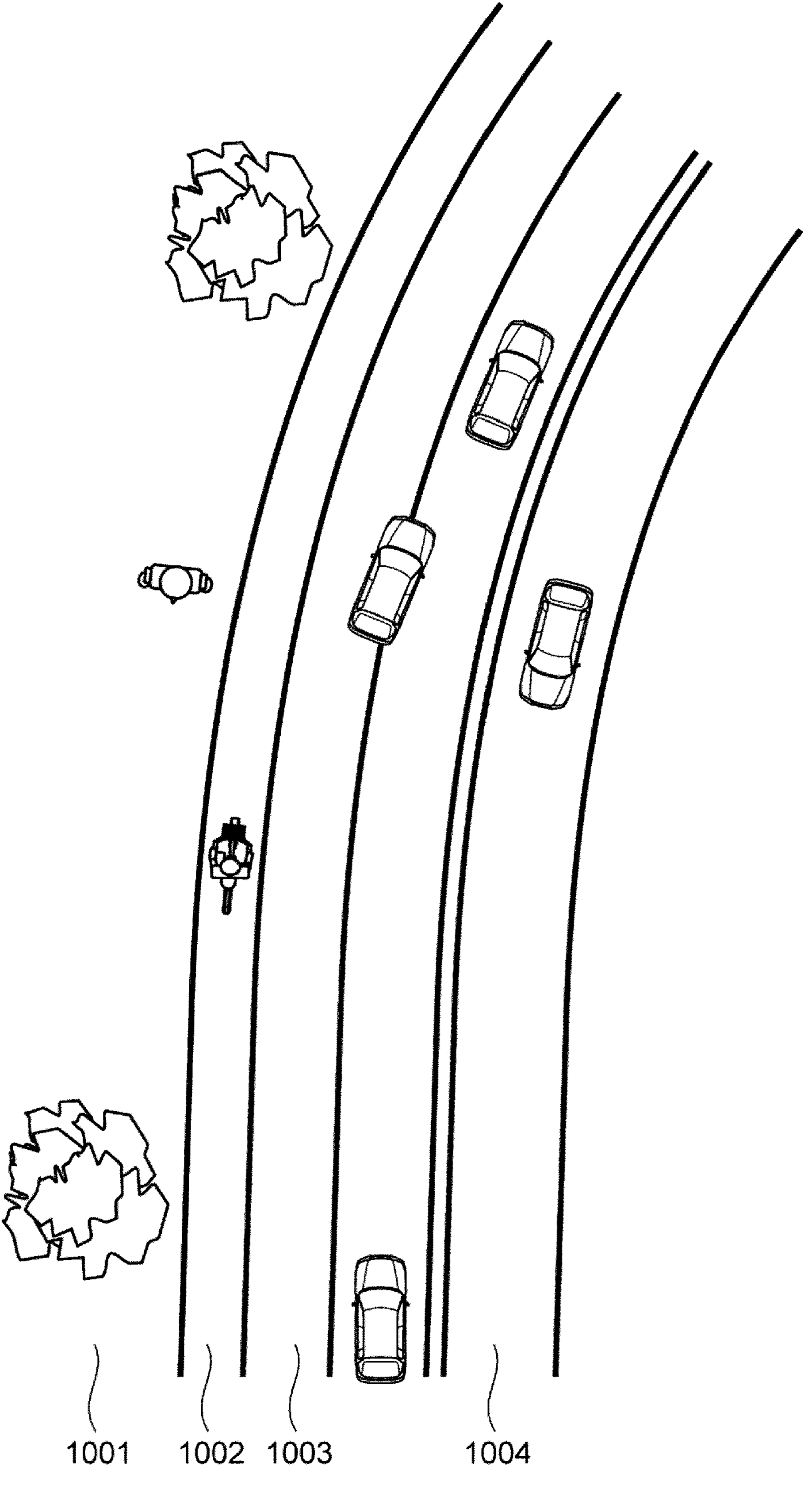
FIG. 10 is a view describing a relationship between a road region and an object in the vehicle control system.

The above embodiment is related to whether or not the vehicle is on the host vehicle lane, but as illustrated in FIG. 10, the present invention can be naturally applied also in a case where an object is present in a road region such as a sidewalk 1001, a road side strip 1002, an adjacent lane 1003, or an opposite lane 1004, or in a case of targeting a road region such as an intersection. The configuration is illustrated in FIG. 11.

In the object detection unit 303 of the image analysis unit 302, a first three-dimensional object detection unit 1101 (hereinafter, simply referred to as three-dimensional object detection unit 1101) detects (recognizes) a pedestrian, a vehicle, a bicycle, a road sign, and the like from an image captured by the imaging device 301. A region detection unit 1102 detects boundary information such as a white line, a zebra zone, a road edge such as a curb, and a crosswalk, which are elements for determining a region by analyzing an image, and estimates (recognizes) the region of the host vehicle lane, an adjacent lane, a road side strip, and a sidewalk indirectly from boundary information or directly from image information. In the inter-object relationship calculation unit 304, a first region position determination unit 1103 (hereinafter, simply referred to as region position determination unit 1103) determines as to which region a detected three-dimensional object belongs to or straddles over or the like from the information of the three-dimensional object detection unit 1101 and the region detection unit 1102. The distance to the region may be saved.

In the object detection unit 307 of the radar analysis unit 306, a second three-dimensional object detection unit 1104 (hereinafter, simply referred to as three-dimensional object detection unit 1104) detects (recognizes) an object from a radar signal obtained from the radar device 305. In the inter-object relationship calculation unit 308, a second region position determination unit 1105 (hereinafter, simply referred to as region position determination unit 1105) determines as to which region a detected object is present using vehicle information and the like. However, since the region here cannot be classified from the radar signal as finely as an image, the region is limited to a host vehicle traveling path, a region without a reflective object, and the like, and is different from the attribute that can be determined by the region position determination unit 1103.

In this manner, calculation results of an object detected by the image analysis unit 302 and the radar analysis unit 306, region information, and a relationship are sent to the sensor fusion unit 309. In the information fusing unit 310 of the sensor fusion unit 309, fusion of the detected objects is performed by a three-dimensional object fusing unit 1106. In the inter-object relationship calculation unit 311, from its fusion result and the result of the region detection unit 1102, a third region position determination unit 1107 (hereinafter, simply referred to as region position determination unit 1107) determines a region position to which the three-dimensional object obtained by fusion belongs.

In the relationship integration determination unit 312, on the basis of each situation, a region position integration determination unit 1108 finally determines as to which position in the defined region the finally detected three-dimensional object exists. However, since there are differences among the region transmitted from the region position determination unit 1103, the region transmitted from the region position determination unit 1105, and the region transmitted from the region position determination unit 1107 as described above, for example, if it is assumed that a road side strip or a sidewalk can be determined only by the region position determination unit 1103, the region position integration determination unit 1108 performs determination from the result of the region position determination unit 1103 and the result of the region position determination unit 1107.

The moving body control device 300 performs vehicle control according to the determination result of the relationship integration determination unit 312 described above. Hereinafter, a case where the relationship integration determination unit 312 outputs and applies, to the ACC, the reliability with respect to the relationship will be considered. Normal ACC is performed when, for example, the relationship integration determination unit 312 has determined the relationship between the host vehicle lane and the preceding vehicle in a state where the reliability of the final determination is high (exceeds a predetermined value). On the other hand, in a case where the relationship between the host vehicle lane and the preceding vehicle has been determined in a state where the reliability of the final determination is low (lower than the predetermined value), the relationship integration determination unit 312 performs vehicle control in a state where the safety of the driver is not greatly affected even if the determination is erroneous by performing acceleration/deceleration or the like required for ACC more moderately than usual.

As described above, the moving body control device (signal processing device) 300 of the present embodiment recognizes a first object (for example, a preceding vehicle) and a second object (for example, a white line) from an image captured by the imaging device 301 (first object detection unit 303: first vehicle detection unit 402, white line detection unit 401, and traveling path estimation unit 403), stores a first positional relationship (for example, inside and outside a host vehicle lane) between the first object and the second object (first inter-object relationship calculation unit 304: first in-traveling path determination unit 404), obtains a position of the first object from information of the first object recognized on the basis of information obtained from a sensor (for example, radar device 305) different from the imaging device 301 and information of the first object recognized on the basis of an image captured by the imaging device 301 (information fusing unit 310: vehicle detection fusing unit 407), obtains a second positional relationship (for example, inside and outside the host vehicle lane) between the obtained first object and the second object recognized on the basis of an image captured by the imaging device 301 (third inter-object relationship calculation unit 311: third in-traveling path determination unit 408), compares the first positional relationship with the second positional relationship, and determines a final positional relationship between the first object and the second object (relationship integration determination unit 312: in-traveling path integration determination unit 409).

When comparing the first positional relationship with the second positional relationship, by comparing a first reliability (first reliability determination unit 501) given or calculated regarding the first positional relationship and a second reliability (third reliability determination unit 505) given or calculated regarding the second positional processing device) 300 determines a final positional relationship between the first object and the second object.

The moving body control device (signal processing device) 300 of the present embodiment recognizes, from an image captured by the imaging device 301, recognizes a first object group (for example, a preceding vehicle group) and a second object group (for example, a white line group) (first object detection unit 303), stores, as the first positional relationship, positional relationships among a plurality of the recognized first objects of the first object group and among a plurality of the recognized second objects of the second object group as well as between the first object group and the second object group (first inter-object relationship calculation unit 304), stores, as a third positional relationship, information of the first object group recognized on the basis of information obtained from a sensor (for example, radar device 305) different from the imaging device 301, and a positional relationship among the plurality of first objects of the first object group recognized on the basis of information obtained from a sensor (for example, radar device 305) different from the imaging device 301 (second inter-object relationship calculation unit 308), obtains a position of the first object group from information of the first object group recognized on the basis of information obtained from a sensor (for example, radar device 305) different from the imaging device 301 and information of the first object group recognized on the basis of an image captured by the imaging device 301 (information fusing unit 310), obtains, as the second positional relationship, a positional relationship between the obtained first object group and the second object group recognized on the basis of an image captured by the imaging device 301 (third inter-object relationship calculation unit 311), compares the first positional relationship, the second positional relationship, and the third positional relationship, and determines a final positional relationship between the first object group and the second object group (relationship integration determination unit 312).

When comparing the first positional relationship, the second positional relationship, and the third position, by comparing a first reliability (first reliability determination unit 501) given or calculated regarding the first positional relationship, a second reliability (third reliability determination unit 505) given or calculated regarding the second positional relationship, and a third reliability (second reliability determination unit 503) given or calculated regarding the third positional processing device) 300 determines a final positional relationship between the first object group and the second object group.

In the present embodiment, appropriately using determination of the relationship in the sensor and determination of the relationship after fusion, it is possible to correct an error in the relationship of a plurality of objects that can occur by performing fusion, and even a complicated sensor system using a plurality of sensors can correctly determine the relationship.

That is, according to the present embodiment, even when detection objects differ among a plurality of sensors, it is possible to correctly obtain the relationship between a non-shared detection object and a detection object that is shared after fusion.

The present invention is not limited to the above-described embodiment, and includes various modifications. For example, the embodiment described above has been described in detail for the purpose of explaining the present invention in an easy-to-understand manner, and is not necessarily limited to that having all the described configurations. It is possible to replace a part of the configuration of one embodiment with the configuration of another embodiment, and it is also possible to add the configuration of another embodiment to the configuration of one embodiment. Another configuration can be added to, deleted from, or replaced with a part of the configuration of each embodiment.

A part or all of the above-described configurations, functions, processing units, processing means, and the like may be implemented by hardware by being designed as an integrated circuit or the like. The above-described configurations, functions, and the like may be implemented by software by a processor interpreting and executing a program implementing those functions. Information such as a program, a table, and a file that implement the functions can be stored in a storage device such as a memory, a hard disk, and a solid state drive (SSD), or a recording medium such as an IC card, an SD card, and a DVD.

For control lines and information lines, those considered necessary for explanation are illustrated. Not necessarily all the control lines and information lines in the product are illustrated. In reality, almost all the configurations may be considered as being mutually connected.

REFERENCE SIGNS LIST

200 object
201 vehicle (host vehicle)
202 preceding vehicle inside host vehicle lane
203 preceding vehicle outside host vehicle lane
204 white line group
205 case where there is no preceding vehicle
300 moving body control device (signal processing device)
301 imaging device
302 image analysis unit
303 first object detection unit
304 first inter-object relationship calculation unit
305 radar device
306 radar analysis unit
307 second object detection unit
308 second inter-object relationship calculation unit
309 sensor fusion unit
310 information fusing unit
311 third inter-object relationship calculation unit
312 relationship integration determination unit
313 vehicle information acquisition device
401 white line detection unit
402 first vehicle detection unit
403 traveling path estimation unit
404 first in-traveling path determination unit
405 second vehicle detection unit
406 second in-traveling path determination unit

407 vehicle detection fusing unit
408 third in-traveling path determination unit
409 in-traveling path integration determination unit
411 result of first vehicle detection unit
412 result of first in-traveling path determination unit
413 result of white line detection unit or traveling path estimation unit
414 result of second in-traveling path determination unit
415 result of second vehicle detection unit
501 first reliability determination unit
502 first statistical information saving unit
503 second reliability determination unit
504 second statistical information saving unit
505 third reliability determination unit
506 third statistical information saving unit
507 correction amount saving unit
511 result of first inter-object relationship calculation unit
512 result of second inter-object relationship calculation unit
601 first in-three-dimensional object relationship calculation unit
602 second in-three-dimensional object relationship calculation unit
603 third in-three-dimensional object relationship calculation unit
701 to 704 preceding vehicle
705 table of output of first in-three-dimensional object relationship calculation unit
706 table of output of second in-three-dimensional object relationship calculation unit
707 table of output of third in-three-dimensional object relationship calculation unit
801 determination saving unit
802 abnormality diagnosis unit
803 abnormality signal
804 abnormality notification unit
901 LIDAR device
902 LIDAR signal analysis unit
903 fourth object detection unit
904 fourth inter-object relationship calculation unit
1001 sidewalk region
1002 road side strip region
1003 adjacent lane region
1004 opposite lane region
1101 first three-dimensional object detection unit
1102 region detection unit
1103 first region position determination unit
1104 second three-dimensional object detection unit
1105 second region position determination unit
1106 three-dimensional object fusing unit
1107 third region position determination unit
1108 region position integration determination unit

The invention claimed is:

1. A signal processing device characterized by recognizing a first object and a second object from an image captured by an imaging device, and storing a first positional relationship between the first object and the second object, obtaining a position of the first object from information of the first object recognized on a basis of fusing information obtained from a sensor different from the imaging device and information of the first object recognized on a basis of an image captured by the imaging device, obtaining a second positional relationship between the first object and the second object based on first sensor data recognizing the first object and second sensor data recognizing the second object, the first sensor data obtained from the sensor different from the imaging device, and the second sensor data recognized on a basis of an image captured by the imaging device, generating a first reliability value corresponding to the imaging device based on a first device attribute of the imaging device and a second reliability value corresponding to the sensor different than the imaging device based on a second device attribute of the imaging device, comparing the first positional relationship recognized based on an image captured by the imaging device with the second positional relationship recognized based on first sensor data obtained from the sensor different from the imaging device and second sensor data obtained from the imaging device to determine a final positional relationship between the first object and the second object, and in response to determining that the first positional relationship does not match the second positional relationship, determining the final positional relationship as one of the first positional relationship or the second positional relationship based on the first reliability value and the second reliability value.

2. The signal processing device according to claim 1, wherein the first device attribute and the second device attribute include at least one of a distance to the first object, a distance to the second object, or a sensor to be used.

3. The signal processing device according to claim 1, characterized by storing the first positional relationship, the second positional relationship, and the final positional relationship, and when a number of times that a value associated with any two positional relationships selected from those positional relationships exceeds a prescribed value representing a threshold difference in distances represented by the any two positional relationships, making a notification indicating a signal abnormality.

4. The signal processing device according to claim 1, characterized by recognizing, from an image captured by the imaging device, a first object group including a plurality of first objects including the first object and a second object group including a plurality of second objects including the second object, and storing, as the first positional relationship, positional relationships between the plurality of recognized first objects in the first object group, between the plurality of recognized second objects in the second object group, and between the first object group and the second object group, storing a third positional relationship between the plurality of the first objects in the first object group recognized on a basis of information obtained from the sensor different from the imaging device, obtaining a position of the first object group from information of the first object group recognized on a basis of information obtained from the sensor different from the imaging device and information of the first object group recognized on a basis of an image captured by the imaging device, obtaining, as the second positional relationship, a positional relationship between the obtained first object group and the second object group recognized on a basis of an image captured by the imaging device, and comparing the first positional relationship, the second positional relationship, and the third positional relationship, and determining a final positional relationship between the first object group and the second object group.

5. The signal processing device according to claim 4, characterized by when comparing the first positional relationship, the second positional relationship, and the third position, comparing a first reliability regarding the first positional relationship, a second reliability regarding the second positional relationship, and a third reliability regarding the third positional relationship, and determining a final positional relationship between the first object group and the second object group.

6. The signal processing device according to claim 4, characterized by storing the first positional relationship, the second positional relationship, the third positional relationship, and the final positional relationship, and when a number of times that a value associated with any two positional relationships selected from those positional relationships exceed a prescribed value representing a threshold difference in distances represented by the any two positional relationships, making a notification indicating a signal abnormality.

* * * * *